United States Patent [19]

Jahr et al.

[11] Patent Number: 4,546,805

[45] Date of Patent: Oct. 15, 1985

[54] DEVICE FOR ROTATOR AND GRAPPLE UNIT SUSPENDED AT A BOOM END

[75] Inventors: Lennart Jahr, Alfta; Sven Wickström, Bollnäs, both of Sweden

[73] Assignee: OSA AB, Alfta, Sweden

[21] Appl. No.: 528,965

[22] Filed: Sep. 2, 1983

[30] Foreign Application Priority Data

Sep. 3, 1982 [SE] Sweden .............................. 8205028

[51] Int. Cl.[4] .............................................. A01G 23/08

[52] U.S. Cl. ................................ 144/34 R; 144/3 D; 144/336

[58] Field of Search .................. 144/3 D, 34 R, 34 E, 144/336, 339

[56] References Cited

U.S. PATENT DOCUMENTS

| | | | |
|---|---|---|---|
| 4,083,463 | 4/1978 | Ericsson | 144/34 R X |
| 4,368,763 | 1/1983 | Eaton | 144/34 R |
| 4,412,777 | 11/1983 | Forslund | 144/34 R |

FOREIGN PATENT DOCUMENTS

| | | | |
|---|---|---|---|
| 7803723 | 11/1979 | Sweden | 144/34 R |

*Primary Examiner*—W. D. Bray

*Attorney, Agent, or Firm*—Cushman, Darby & Cushman

[57] ABSTRACT

The invention relates to a device at a rotator and grapple unit intended for tree handling and suspended at the end of a boom. The rotator (8) and grapple (11) are connected each to a pair of flexible operating lines (6,7 and, respectively, 9,10) from a hydraulic pump (1) via a control valve (3). For rendering possible completion of the unit with a hydraulic sawing device without adding two additional hydraulic hoses for this purpose, which would give rise to problems due to the combined bending and rotary movement at the crane tip and resulting heavily increased strains and wear on a bundle consisting of six hoses, according to the invention a branch line (13) is taken from the operating line (10) used for closing the grapple (11), which branch line is located in a place after the rotator (8). The branch line (13) extends to a hydraulic sawing device (15,16) via a pressure-sensing valve (14). This valve is opened when the operator after completed gripping function adjusts the hydraulic pump (1) to a higher pressure level in order thereby to drive the sawing device from the operating line (10). When the sawing is completed, the operator resets the pump to the original pressure level, and the return flow from the sawing device passes out through return lines (22,25) and the second operating line (9) of the grapple (11). The unit is thereby ready for a new setting, gripping and sawing operation.

5 Claims, 1 Drawing Figure

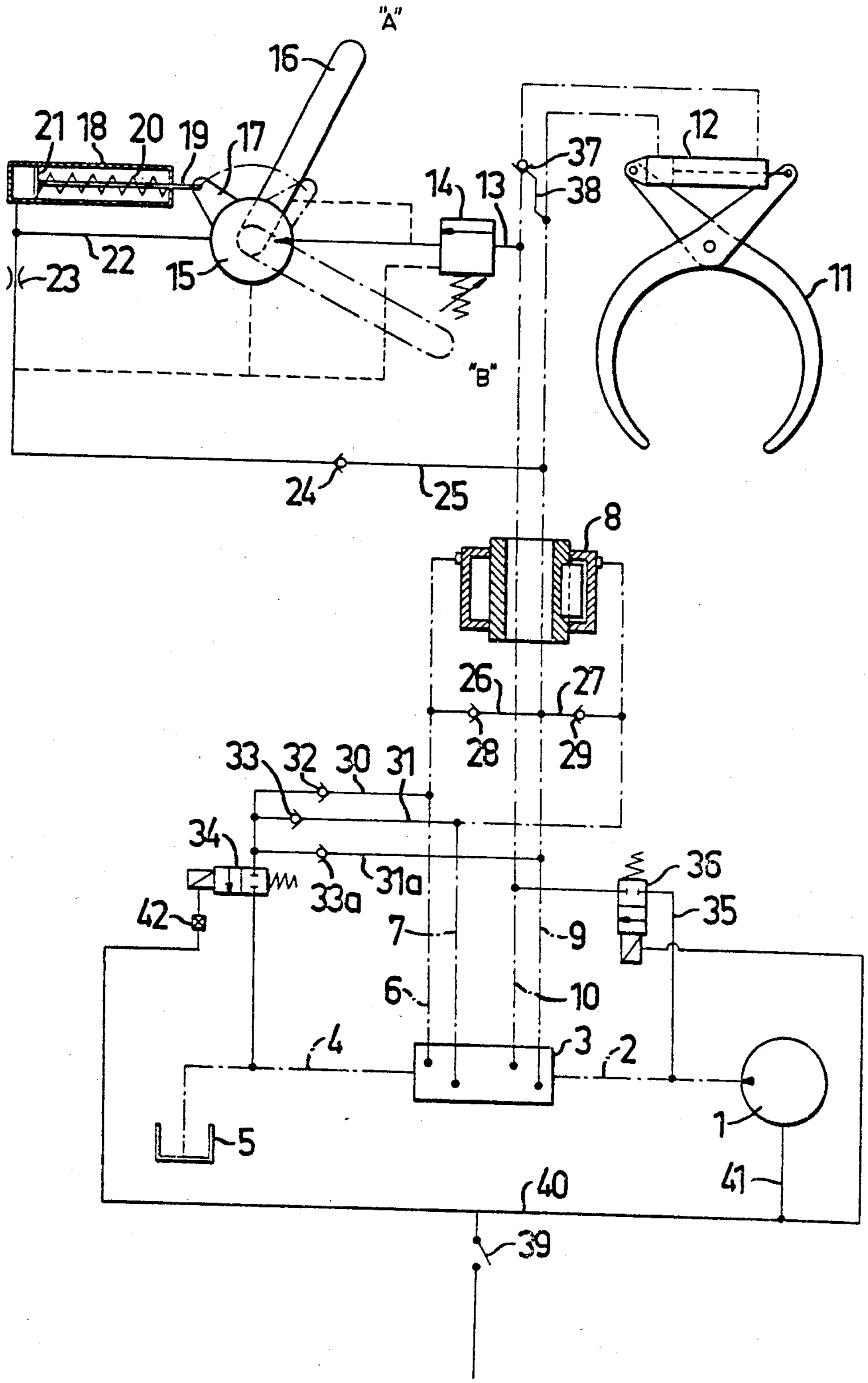
"A"
16
21 18 20 19 17
14 13
37
38
12
22
23
15
11
"B"
24
25
8
26 27
28 29
33 32 30 31
34
33a 31a
36
42
35
7
9
6
10
4
3
2
1
5
40
41
39

DEVICE FOR ROTATOR AND GRAPPLE UNIT SUSPENDED AT A BOOM END

This invention relates to a device for rotator and grapple unit for the handling of trees which is suspended at the end of a boom, and the rotator and grapple are connected each to a pair of flexible operating lines from a hydraulic pressure source via a control valve.

When hydraulic cranes are used in mechanized forestry, the booms usually carry four hydraulic lines all the way to the boom tip. Two of the lines are used for opening and closing the grapple, and the remaining two lines are used for rotating the rotator, on which the grapple is suspended, in clockwise and counter-clockwise direction.

The said number of lines at the boom tip are fully satisfactory for the loading and unloading of timber, but when the grapple is combined with sawing equipment (grab saw) for cross-cutting logs with maintained grip, or when the grab tool is comprised in a felling unit with sawing or cutting function, two additional hydraulic lines are required for the cross-cutting or felling function. The existing boom must, if possible, be provided with complimentary lines, or it must be exchanged with a boom, which is equipped already from the beginning with six hydraulic lines (hoses) all the way to the boom tip.

In both cases, however, the problems are aggravated which arise by the function of movement, composed of bending and rotating, at the boom tip, viz. high strains on the connecting hydraulic hoses. These strains are caused by the fact that the hoses wear against each other in their rigid state when the necessary hydraulic pressure is applied. The greater the number of hoses comprised in the hose bundle, the greater is the resistance to motion and thereby the wear. The hoses, moreover, are exposed at the boom tip to substantial external damaging forces from branches and knots and, therefore, relatively often must be replaced by new ones. It is, therefore, of great interest to limit the new number of hoses to a minimum at the transition from the boom tip to the rotator and to a tool carried by the rotator, for example a grab saw or felling unit.

The invention solves this problem in a way which is advantageous from an economic as well as from a function aspect, in that at the operating line for closing the grapple a branching is located which, via a valve which can be opened and closed, brings the inlet of a connected hydraulic sawing device, which is complementary to the unit, into momentary driving connection with the operating line for carrying out the sawing operation, and the outlet of the sawing device is connected unidirectionally to the second operating line of the grapple for conducting away the return flow.

The shifting from grab to saw function is actuated by manual control. At a preferred embodiment, this shifting occurs automatically by utilizing a pressure-sensing valve, which is located on the grab saw and, respectively, felling unit. The shifting of the hydraulic pressure from completed grab function over to saw function is effected by the valve, in that the driving hydraulic pump is caused via a manually released impulse to increase the hydraulic presure to a higher, valve-opening level when the operator wishes to carry out sawing. When this has been carried out and the hydraulic pressure thereby approaches zero, the valve closes again.

The grapple and rotator functions can then again be started by the slightly lower hydraulic pressure intended for these functions. In this connection an additional great, not yet mentioned advantage gained by the restriction to four lines may be pointed out, viz. that existing conventional loading cranes easily can be converted to cranes, which from a function point of view are fully suitable also for grab saws and felling units.

The preferred embodiment briefly indicated above is described in greater detail in the following, with reference to the accompanying drawing, which is a schematic view of the embodiment.

At first, that part of the hydraulic system is briefly described which is the standard system for conventional simple loading cranes. This standard system is indicated by dash-dotted lines in the drawing. From a hydraulic pump 1 a pressure line 2 extends to a control valve 3, which has a return line 4 to a hydraulic tank 5. From the control valve 3 two operating lines 6 and 7 extend to the rotator 8, and two operating lines 9 and 10 extend for opening and closing the grapple 11 via a grab cylinder 12. This system is known previously and can be said to be conventional.

According to the invention, this conventional system can, without adding extra operating lines from the control valve, be completed so as to comprise also a sawing function. At the embodiment shown, this is brought about as follows.

From the operating line 10 of the grapple, in a place located after the rotator 8, a branching line 13 extends via a pressure-sensing valve 14 to a saw motor 15, which is mounted pivotally about its centre. The saw carries a guide bar 16 with a position "A" indicated by fully drawn lines prior to the sawing moment, and a position "B" indicated by dash-dotted lines subsequent to completed sawing operation. At the saw motor 15 a moment arm 17 is rigidly secured, at the end of which the piston rod 19 to a hydraulic cylinder 18 with piston 21 is pivotally attached. The hydraulic cylinder 18 is combined with a return device 20, which similar to the arrangement according to SE-PS 330 460 has the object to return the guide bar 16 to position "A" when the sawing operation is completed. From the saw motor 15 a branched return line 22 extends to feed the cylinder 18 and, via a throttle valve 23 and a check valve 24 in a line 25, to effect final return connection to the operating line 9 of the grapple, which line in this case is the return line.

In order to facilitate the return flow by low counterpressure, the return line 9 is completed with two branchings 26 and 27, which via check valves 28 and, respectively, 29 are connected to the rotator lines 6 and 7. However, as these lines at the return moment are closed at the control valve 3, complementary return lines 30,31,31*a* are branched from the rotator lines and extend to the ordinary return line 4 of the system via respective check valves 32,33,33*a* and thereafter the shut-off valve 34 for the system.

From the pressure line 2 a branch line 35 extends via the shut-off valve 36 of the grapple to the operation line 10 of the grapple. Between the aforementioned branch line 13 and grapple cylinder 12, a pilot-controlled check valve 37 is inserted for maintaining grapple pressure after the pressure-sensing valve 14 has opened. The check valve 37 is connected via a pilot line 38 to the operating line 9 and is opened for the return flow from the grapple cylinder by action of the pressure from the pilot line 38 when pressure has been applied on the operating line 9. For the shifting from the conventional function for grapple 12 and rotator 8 to sawing function, finally, an electric control system is provided, which consists of a saw control contact 39, which upon its closing via an electric line 40 sends an impulse for opening the shut-off valves 34,36 and via an electric line 41 sends an impulse for increased pressure of the pump 1. Simultaneously pressure is applied on the operating line 10 via the control valve 3.

The procedure at the shifting to sawing function and back to conventional function, thus, is as follows.

When the operator (driver) closes the contact 39, the increased hydraulic pressure in the operating line 10 of the grapple opens the pressure-sensing valve 14, so that the hydraulic motor of the saw is started. The chain on the guide bar 16 then starts running, and at the same time the return oil from the motor 15 via the return line 22 meets a certain flow resistance when it passes the throttle valve 23 for continued flow to the tank. the flow resistance builds up a pressure, which propagates to the saw feed cylinder 18 and acts driving on the piston 21. Thereby the piston rod 19 causes the guide bar 16 via the moment arm 17 to pivot from position "A" to position "B". Simultaneously the return device 20 is charged by the piston movement in the cylinder 18.

Return oil, which has not been taken up by the cylinder 18, has meanwhile returned to the tank 5 through the lines 25,9,26,27,6,7,30,31, 31*a* and 4. The shut-off valve 34 has been open during the entire saw moment and closes first after all return oil has passed. When the guide bar has completed the sawing operation, the operator breaks the control contact 39. Thereby the hydraulic pump 1 is shifted to the lower pressure, and the control valve 3, pressure-sensing valve 14 and shut-off valve 36 are closed immediately, while the shut-off valve 34 is closed with delay via a time delay valve 42, so that all return oil from the saw feed cylinder 18 is given the time to pass out.

When the pressure-sensing valve 14 has stopped the flow to the motor 15, the return device 20 starts pressing back the piston 21 of the cylinder 18, and thereby the piston rod 19, so that the guide bar 16 is pivoted back to position "A". During this movement, the cylinder 18 gives off the residue return oil through the return lines, before the valve 34 closes, whereafter the hydraulic system again has conventional grapple-rotator function via the ordinary hydraulic system.

Various modifications of the preferred embodiment described above can be imagined within the scope of the invention. The increased hydraulic pressure, for example, can be brought about by coupling-in an auxilliary pump coupled in parallel with the ordinary pump. Alternatively can be imagined to constantly drive the ordinary pump with a pressure sufficiently high for both the grapple and sawing function and effect the opening of the valve of the branch line by a pilot pressure from the grapple in the final position thereof, or in another way, for example by a magnet valve.

What we claim is:

1. A tree handling device comprising a hydraulic cutting means, a rotator having a first pair of flexible hydraulic operating supply and return lines, a grapple having a second pair of flexible hydraulic operating supply and return lines, said first and second supply and return lines connected to a control valve means to control hydraulic fluid from a hydraulic source, a branch line connected to the second supply line, the branch line having a pressure sensitive valve to supply fluid pressure to the hydraulic cutting means, the rotator and grapple being operable and the pressure-sensing valve being closed at a first hydraulic pressure from the hydraulic source, and a means to increase the hydraulic pressure whereby the pressure sensing valve opens to drive the hydraulic cutting means.

2. A tree handling device according to claim 1 wherein said second supply line includes a pilot control check valve capable of being actuated by a gripping action of the grapple to maintain said gripping action during a cutting operation of the hydraulic cutting means, the pilot control check valve being situated downstream of the branch line.

3. A tree handling device according to claim 1 wherein a pair of third fluid return lines are connected from said second return line to the first fluid supply and return lines, check valves being provided in said third return lines to allow fluid to flow to the first supply and return lines, the third fluid return lines being provided to accelerate a return flow from said cutting means to a hydraulic reservoir.

4. A tree handling device according to claim 1 wherein a fourth pair of fluid return lines are connected to said first supply and return lines, the fourth pair of fluid lines having check valves to allow fluid to flow from the first supply and return lines to a hydraulic reservoir to accelerate fluid return from the cutting means.

5. A tree handling device comprising a grapple for gripping logs, a rotator for rotating the grapple, the rotator having a first pair of flexible hydrualic operating supply and return lines, the grapple having a second pair of flexible hydraulic operating supply and return lines, said first and second supply and return lines being connected to a control valve means to control hydraulic fluid from a hydraulic source, a branch line connected to the second supply line and having a pressure sensitive valve, the branch line supplying fluid to a hydraulic cross-cutting means capable of cutting logs held in said grapple, the rotator and grapple being operable and said pressure-sensitive valve being closed at a first hydraulic operating pressure, the device further comprising a means to increase said operating pressure whereby the pressure sensing valve opens allowing fluid to flow to drive the hydraulic cross-cutting means.

* * * * *